Figure 1:
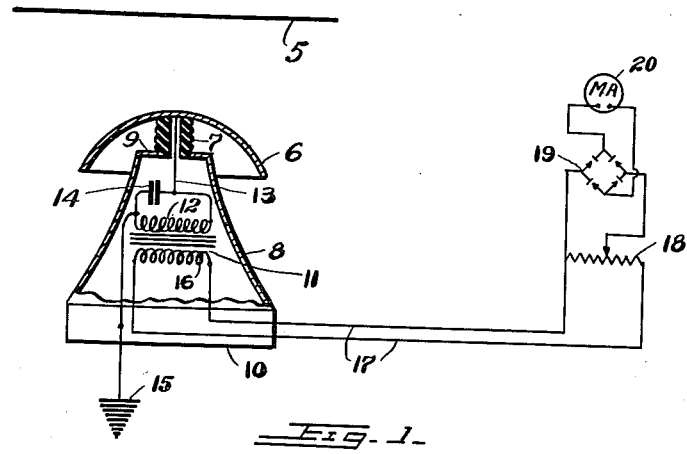

Nov. 17, 1936.                G. B. TEBO ET AL                2,061,115
                             HIGH POTENTIAL INDICATOR
                              Filed Dec. 14, 1934

Inventors
Gordon Buchanan Tebo &
John G. Burkholder
By Frederick E. Bromley
Attorney Patented Nov. 17, 1936

2,061,115

UNITED STATES PATENT OFFICE 2,061,115

HIGH POTENTIAL INDICATOR

Gordon Buchanan Tebo and John C. Burkholder, Toronto, Ontario, Canada

Application December 14, 1934, Serial No. 757,464

10 Claims. (Cl. 175—183)

As is well known in the art, in the measurement of alternating high potentials to which a direct connection of a meter is impracticable, it is customary to interpose an auxiliary device to reproduce the potential on a considerably reduced scale.

Where a high degree of accuracy in ratio and phase position of the secondary voltage is requisite, a potential transformer may be used as the auxiliary instrument, but its cost may render it prohibitive where such accuracy is not required, particularly in the case of very high potentials. A condenser bushing applied to a transformer and condenser-reactor network is only suitable for a moderately accurate indication and therefore has its limitations.

The present invention has for its object the production of an improved indication means for the purpose above set out, one that possesses distinct advantages and that is inexpensive of manufacture.

The invention comprehends the employment of an air condenser comprising a pick-up plate in the vicinity of a high voltage conductor but suitably spaced therefrom so as to have an intervening air dielectric. The pick-up plate is specially shaped so as to form a hood or canopy for an insulating member that supports it on a case housing a transformer of which the primary is electrically connected to the pick-up plate and grounded. The lower voltage of the secondary is rectified and conducted to a D. C. milliammeter for the potential indication.

A special feature of the invention resides in the canopy construction of the pick-up plate and the particular design of the case whereby the insulator is shielded to protect it in wet weather in order that it may not become wet or moist, which would result in an electric leakage path that would adversely affect the meter indication.

It will be apparent that in obtaining a potential indication from an insulator string embodying either a single or multi-part insulator, the necessary connection to the insulator hardware can only be effected with the line dead. Further, the insulation value of the unit from which the indication is taken is weakened. However, by making use of the capacitance of an air condenser in accordance with the present invention, the potential indication is unaffected by temperature, humidity or other atmospheric conditions.

A salient feature of the invention is that the indicating meter may be remotely located with respect to the high potential source from which measurement is taken, as for instance from an outdoor switching structure to a control room panel.

A further salient feature of the invention is that by employing a transformer in conjunction with a copper-oxide rectifier and a D. C. milliammeter, it is possible to produce a calibration for the reading of voltage on a uniform scale on the meter.

A distinctive advantage of the present system of potential indication is that the step-down potential transformer produces at its secondary terminals a much lower voltage and a correspondingly larger current than that flowing from the pick-up plate to ground. The ratio of primary to secondary current may be in the order of 100:1.

In the accompanying drawing, Figure 1 illustrates the invention which is shown part structurally and part diagrammatically.

Figure 2:
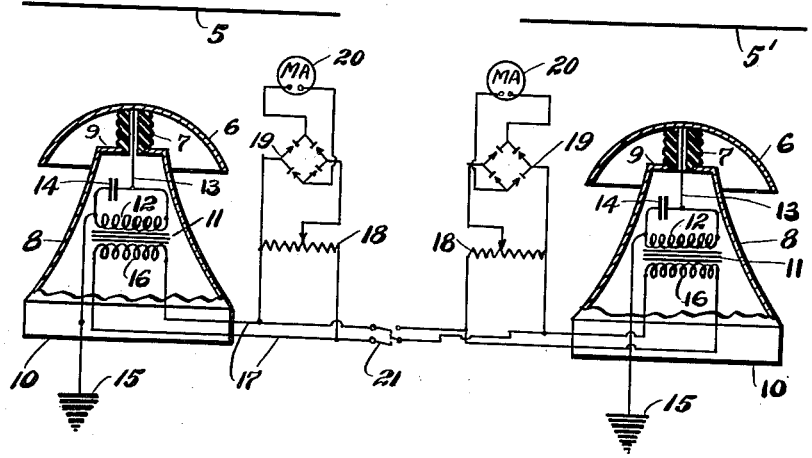

Figure 2 shows a pair of the devices depicted in Figure 1 coupled to indicate the phase displacement of the two high potential conductors.

Adverting to Figure 1, the high voltage conductor is indicated at 5 and below this is shown the pick-up plate 6 which is a metallic member downwardly curved to form a canopy for the insulator 7 that supports it on the case 8. The metal case has a flat top 9 on which the insulator rests and over which the canopy fits to completely shield the insulator. The sides of the case are flared to the base 10.

The case houses the step-down transformer 11 of which the primary 12 is connected by the lead 13 to the pick-up plate and has a capacity 14 in parallel with the high voltage winding. This winding is grounded at 15. The low voltage winding 16 is connected by the leads 17 to the potentiometer 18 and to the copper-oxide rectifier 19, the rectified current being indicated by the milliammeter 20.

It may be here remarked that the current flowing from the high potential conductor to ground through the primary winding of the transformer is fixed by the value of the voltage and the impedance of the air condenser. A value of capacitance for the fixed condenser 14 may be chosen to produce resonance of the primary circuit at the frequency of the supply voltage. In this resonant condition, the portion of current necessary to magnetize the iron is fully supplied by the condenser, leaving the full current from the high-potential conductor available for transformation in order to obtain accurate indication on the meter.

The operation and advantages of this device and method of indicating high-potential will be obvious from what has already been recounted.

As shown in Figure 2, two of the devices may be combined by the addition of a double-pole single throw switch 21 to indicate the phase displacement between potentials of conductors 5 and 5'. It will be evident that with the switch closed, both meters fluctuate between zero and full scale as the two supply-voltages on 5 and 5' vary in phase position. When both meters register zero the voltages of 5 and 5' are in phase, and paralleling switches (not shown) between the supply voltages may be safely closed.

What we claim is:—

1. In a device of the class described, a case having a supporting base and a top wall closing the top of the case and having a small hole leading into the case, an insulator mounted on said top wall and having an opening therethrough in register with said hole in the top wall, an imperforate pick-up plate supported by the insulator and having its walls downwardly inclined to shield the insulator and a lead from the pick-up plate extending through the insulator opening and the hole in the top wall to the interior of the case.

2. In a device of the class described, a case having a supporting base and a top wall closing the top of the case and having a small hole leading into the case, an insulator mounted on said top wall and having an opening therethrough in register with said hole in the top wall, an imperforate pick-up plate supported by the insulator and having its walls downwardly inclined to surround the insulator and to also encompass the top portion of said case, and a lead from the pick-up plate extending through the insulator opening and the hole in the top wall to the interior of the case.

3. In a device of the class described, a metal case having a reduced top portion, a top wall closing the top portion thereof and having a hole leading into the case, an insulator mounted on said top wall and having an opening therethrough in register with the hole therein, an imperforate metal pick-up plate centrally supported by the insulator and shaped to form a canopy for the insulator and the top portion of the case and a lead from the pick-up plate extending through the insulator opening and the hole in the top wall to the interior of the case.

4. In a device of the class described, an air condenser comprising a high potential conductor, an imperforate metal pick-up plate disposed within the electrostatic field thereof, an insulator supporting the plate, and a lead extending from said plate the structure being characterized in that said lead extends through the insulator which is entirely disposed within the plate and protected by it.

5. In a device of the class described, an air condenser comprising a high potential conductor, a canopy pick-up plate disposed within the electrostatic field thereof, an insulator supporting the plate but housed thereby from atmospheric conditions, and a lead extending from the plate.

6. In a device of the class described, an air condenser comprising a high potential conductor, a metal pick-up plate disposed within the electrostatic field thereof and forming an imperforate canopy, an insulator centrally sustaining the canopy and protected thereby, and a lead connected to the canopy and extending through the insulator.

7. The combination with a high potential source of alternating current, of an indicator comprising a metal pick-up plate disposed within the electrostatic field of the potential source aforesaid, an insulator supporting the plate, a metal case forming a mounting for the insulator, a step-down transformer within the case having an end of its primary connected to said plate and the other end grounded, and means connected with the secondary of the transformer for rectifying and indicating the current thereof.

8. A structure in accordance with claim 7, in which the primary circuit of the transformer has a fixed condenser having a value of capacitance suitable to produce resonance at the frequency of the supply voltage.

9. The combination with a high potential source of alternating current of an indicator comprising a metal pick-up plate disposed within the electrostatic field of the potential source aforesaid, an insulator supporting the plate, a metal case forming a mounting for the insulator, a step-down transformer within the case having an end of its primary connected to said plate and the other end grounded, a rectifier in circuit with the secondary winding of the transformer, and a meter in circuit with the rectifier for indicating current potential.

10. The combination with two separate high potential conductors of alternating current, of two similar devices for indicating phase displacement of the potentials of said conductors, each device comprising a metal pick-up plate disposed within the electrostatic field of the respective conductor to which it is applied, an insulator supporting the plate, a metal case forming a mounting for the insulator, a step-down transformer within the casing having an end of its primary connected to said plate and the other end grounded, means connected with the secondary of the transformer for rectifying the current therefrom and indicating the phase position; and switch means in circuit with the secondaries of both of the aforesaid devices to couple them one to the other.

GORDON BUCHANAN TEBO.
JOHN C. BURKHOLDER.